(12) United States Patent
Asada

(10) Patent No.: US 10,113,766 B2
(45) Date of Patent: Oct. 30, 2018

(54) AIR-CONDITIONING MANAGEMENT DEVICE AND AIR-CONDITIONING SYSTEM USING THE SAME

(71) Applicant: Mitsubishi Electric Corporation, Tokyo (JP)

(72) Inventor: Satoshi Asada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 15/528,126

(22) PCT Filed: Feb. 23, 2015

(86) PCT No.: PCT/JP2015/055082
§ 371 (c)(1),
(2) Date: May 19, 2017

(87) PCT Pub. No.: WO2016/135836
PCT Pub. Date: Sep. 1, 2016

(65) Prior Publication Data
US 2017/0321918 A1  Nov. 9, 2017

(51) Int. Cl.
*G05B 19/042* (2006.01)
*F24F 11/89* (2018.01)
*F24F 11/30* (2018.01)
*F24F 11/62* (2018.01)
*F24F 110/00* (2018.01)
(Continued)

(52) U.S. Cl.
CPC .............. *F24F 11/89* (2018.01); *F24F 11/30* (2018.01); *F24F 11/62* (2018.01); *G05B 19/042* (2013.01); *F24F 11/46* (2018.01); *F24F 11/65* (2018.01); *F24F 2110/00* (2018.01); *F24F 2140/50* (2018.01); *F24F 2140/60* (2018.01); *G05B 2219/2614* (2013.01)

(58) Field of Classification Search
CPC ..................................... G05B 19/042
See application file for complete search history.

(56) References Cited

FOREIGN PATENT DOCUMENTS

JP    2014-081123 A    5/2014

OTHER PUBLICATIONS

International Search Report of the International Searching Authority dated May 26, 2015 for the corresponding International application No. PCT/JP2015/055082(and English translation).

*Primary Examiner* — Tejal Gami
(74) *Attorney, Agent, or Firm* — Posz Law Group, PLC

(57) ABSTRACT

An air-conditioning management device includes: a power consumption obtaining unit that obtains both individual air-conditioned area and overall power consumption amounts in one day; an overall excess coefficient calculation unit that calculates an overall excess coefficient on a monthly basis; an individual excess coefficient calculation unit that calculates individual excess coefficients each indicating a degree of excess from the individual target value on a monthly basis; an excess determination unit that determines whether the overall excess coefficient is larger than a set threshold value; an energy saving control setting unit that sets energy saving control conditions for the respective air-conditioned areas to provide high energy saving effects in descending order of the individual excess coefficients when the overall excess coefficient is determined to be larger than the set threshold value; and an operation control unit that performs energy saving operation of the air-conditioning apparatuses based on the energy saving control conditions.

5 Claims, 6 Drawing Sheets

(51) Int. Cl.
*F24F 140/50* (2018.01)
*F24F 140/60* (2018.01)
*F24F 11/65* (2018.01)
*F24F 11/46* (2018.01)

FIG. 4

| NUMBER OF DAYS | CALCULATION OF OVERALL EXCESS COEFFICIENT EC0 | OPERATION OF EXCESS DETERMINATION UNIT 14 |
|---|---|---|
| DAY 1 | OVERALL EXCESS COEFFICIENT EC0 OF DAY 1 (AT 23:59) (= OVERALL POWER CONSUMPTION AMOUNT EP0d/TARGET POWER AMOUNT TP0d) | DETERMINE NECESSITY OF ENERGY SAVING CONTROL ON DAY 1 |
| DAY 2 | OVERALL EXCESS COEFFICIENT EC0 OF DAY 1 (AT 23:59) (= OVERALL POWER CONSUMPTION AMOUNT EP0d/TARGET POWER AMOUNT TP0d) + OVERALL EXCESS COEFFICIENT EC0 OF DAY 1 (AT 23:59) (= OVERALL POWER CONSUMPTION AMOUNT EP0d/TARGET POWER AMOUNT TP0d) / 2 | DETERMINE NECESSITY OF ENERGY SAVING CONTROL ON DAY 2 |
| ... | ... | ... |
| DAY 30 | OVERALL EXCESS COEFFICIENT EC0 OF DAY 1 (AT 23:59) (= OVERALL POWER CONSUMPTION AMOUNT EP0d/TARGET POWER AMOUNT TP0d) + ... + OVERALL EXCESS COEFFICIENT EC0 OF DAY 30 (AT 23:59) (= OVERALL POWER CONSUMPTION AMOUNT EP0d/TARGET POWER AMOUNT TP0d) / 30 | DETERMINE NECESSITY OF ENERGY SAVING CONTROL ON DAY 30 |

FIG. 5

| NUMBER OF DAYS | CALCULATION OF INDIVIDUAL EXCESS COEFFICIENT EC1-EC3 BY INDIVIDUAL EXCESS COEFFICIENT CALCULATION UNIT 13 | PRIORITY RANKING |
|---|---|---|
| DAY 1 | INDIVIDUAL EXCESS COEFFICIENT EC1 OF AIR-CONDITIONED AREA AA1 OF DAY 1 (AT 23:59) {AA2, AA3} | RANKING CALCULATION OF DAY 1 |
| DAY 2 | INDIVIDUAL EXCESS COEFFICIENT EC1 OF AIR-CONDITIONED AREA AA1 OF DAY 1 (AT 23:59) {AA2, AA3} + INDIVIDUAL EXCESS COEFFICIENT EC1 OF AIR-CONDITIONED AREA AA1 OF DAY 2 (AT 23:59) {AA2, AA3} ÷ 2 | RANKING CALCULATION OF DAY 2 |
| ... | ... | ... |
| DAY 30 | INDIVIDUAL EXCESS COEFFICIENT EC1 OF AIR-CONDITIONED AREA AA1 OF DAY 1 (AT 23:59) {AA2, AA3} + ... + INDIVIDUAL EXCESS COEFFICIENT EC1 OF AIR-CONDITIONED AREA AA1 OF DAY 2 (AT 23:59) {AA2, AA3} ÷ 30 | RANKING CALCULATION OF DAY 30 |

FIG. 6

| RANKING | ENERGY SAVING CONTROL CONDITION | AIR-CONDI-TIONED AREA |
|---|---|---|
| 1 | MEDIUM | AIR-CONDITIONED AREA AA3 |
| 2 | MEDIUM | AIR-CONDITIONED AREA AA1 |
| 3 | SMALL | AIR-CONDITIONED AREA AA2 |
| 4 | SMALL | × × × × × |
| 5 | NONE | × × × × × |
| 6 | NONE | × × × × × |
| 7 | NONE | × × × × × |

15d

SEL=1

FIG. 7

| RANKING | ENERGY SAVING CONTROL CONDITION | AIR-CONDI-TIONED AREA |
|---|---|---|
| 1 | LARGE | AIR-CONDITIONED AREA AA3 |
| 2 | LARGE | AIR-CONDITIONED AREA AA1 |
| 3 | LARGE | AIR-CONDITIONED AREA AA2 |
| 4 | LARGE | × × × × × |
| 5 | MEDIUM | × × × × × |
| 6 | MEDIUM | × × × × × |
| 7 | NONE | × × × × × |

15d

SEL=4

AIR-CONDITIONING MANAGEMENT DEVICE AND AIR-CONDITIONING SYSTEM USING THE SAME

CROSS REFERENCE TO RELATED APPLICATION

This application is a U.S. national stage application of PCT/JP2015/055082 filed on Feb. 23, 2015, the contents of which are incorporated herein by reference.

TECHNICAL FIELD

The present invention relates to an air-conditioning management device that performs energy saving control for lowering electric bills and an air-conditioning system using the same.

BACKGROUND ART

In these days, expectations for energy saving by air-conditioning cooling/heating appliances have been raised, and lowering of not only basic rates, but also usage-based rates of electric bills is required. Therefore, conventionally, various kinds of methods for lowering the electric bills and saving energy have been suggested (for example, refer to Patent Literature 1). Patent Literature 1 discloses that a target value in power reduction per unit time is set for each of plural indoor units, and based on energy saving priority and the target value in power consumption reduction of each indoor unit set by a user, energy saving operation of each indoor unit is performed. This makes it possible to realize so-called "visualization" of the target value of power consumption amount and a current status of utilization by an energy management function.

CITATION LIST

Patent Literature

Patent Literature 1: Japanese Unexamined Patent Application Publication No. 2014-81123

SUMMARY OF INVENTION

Technical Problem

Of the electric bills, the basic rates are determined based on contracted power, and the contracted power is calculated with reference to a demand value. Therefore, when energy saving control in a demand time period (for example, 30 minutes) is performed, the basic rates can be suppressed. However, in some cases, it is impossible to reduce the power consumption amount on a monthly basis of the usage-based rates of the electric bills.

When the above-described entire electric bills are to be lowered, as shown in Patent Literature 1, it is considered that an object of the energy saving operation is determined based on the energy saving priority set by a user. However, an indoor unit of low energy saving priority is brought into a state in which the energy saving control is less likely to be performed, and thereby fairness among plural air-conditioned areas cannot be secured in some cases.

The present invention has been made to solve the above-described problems, and has as an object to provide an air-conditioning management device capable of suppressing power consumption on a monthly basis and ensuring fairness among plural air-conditioned areas and an air-conditioning system using the same.

Solution to Problem

An air-conditioning management device according to an embodiment of the present invention manages power consumption amounts of one or plural air-conditioning apparatuses performing air-conditioning in plural air-conditioned areas, and includes: a power consumption obtaining unit that obtains an overall power consumption amount of the one or plural air-conditioning apparatuses in their entirety in one day and individual power consumption amounts of the respective plural air-conditioned areas; an overall excess coefficient calculation unit that calculates an overall excess coefficient from the overall power consumption amount in one day obtained by the power consumption obtaining unit and an overall target value set on a monthly basis, the overall excess coefficient indicating a degree of excess from the overall target value on the monthly basis; an individual excess coefficient calculation unit that calculates individual excess coefficients from the individual power consumption amounts in one day obtained by the power consumption obtaining unit and individual target values set on a monthly basis, the individual excess coefficients each indicating a degree of excess from the individual target value on the monthly basis; an excess determination unit that determines whether or not the overall excess coefficient calculated in the overall excess coefficient calculation unit is larger than a set threshold value; an energy saving control setting unit that sets energy saving control conditions for the respective plural air-conditioned areas to provide increased energy saving effects in descending order of the individual excess coefficients calculated in the individual excess coefficient calculation unit when the overall excess coefficient is determined, in the excess determination unit, to be larger than the set threshold value; and an operation control unit that performs energy saving operation of the air-conditioning apparatuses based on the energy saving control conditions set in the energy saving control setting unit.

Advantageous Effects of Invention

According to an air-conditioning management device of an embodiment of the present invention, by performing energy saving control based on an overall target value on a monthly basis, it is possible to lower the electric bills in their entirety collected on a monthly basis. Then, when the energy saving control is performed, among the plural air-conditioned areas, by performing the energy saving operation of the air-conditioning apparatuses based on energy saving control conditions providing high energy saving effects in descending order of individual excess coefficients, limitation in operation by the energy saving control is less likely to be imposed on the air-conditioned area having relatively low individual excess coefficient and contributing to energy saving; accordingly, fairness can be ensured.

BRIEF DESCRIPTION OF DRAWINGS

FIG. 4 is a schematic view showing calculation of an overall excess coefficient on a monthly basis in an overall excess coefficient calculation unit in FIG. 2.

FIG. 5 is a schematic view showing calculation of individual excess coefficients on a monthly basis in an individual excess coefficient calculation unit in FIG. 2.

FIG. 6 is a schematic view showing an example of a control setting table in FIG. 4.

FIG. 7 is a schematic view showing another example of the control setting table in FIG. 4.

DESCRIPTION OF EMBODIMENTS

Figure 1:
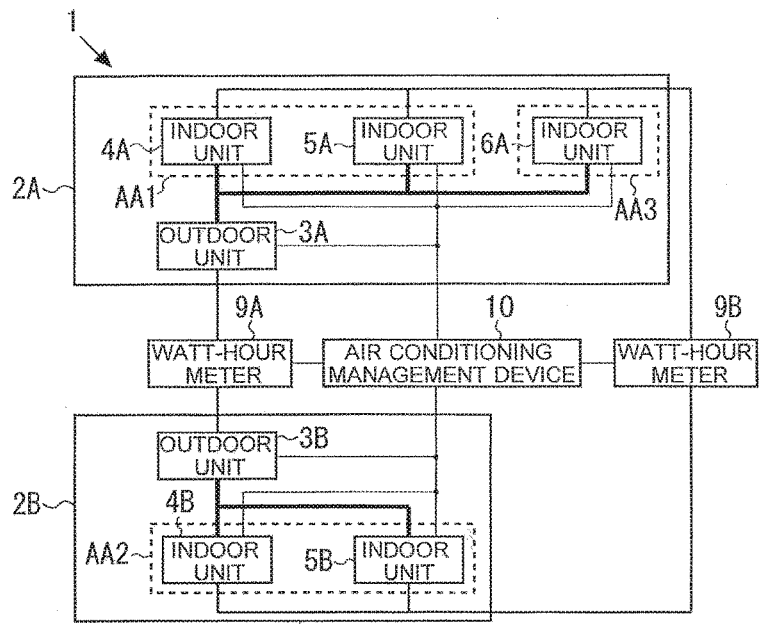
FIG. 1 is a block diagram showing an air-conditioning system using an air-conditioning management device in an embodiment according to the present invention.

Hereinafter, Embodiment 1 of an indoor unit according to the present invention will be described with reference to drawings. FIG. 1 is a block diagram showing an air-conditioning system using an air-conditioning management device in an embodiment according to the present invention. An air-conditioning system 1 includes: plural air-conditioning apparatuses 2A and 2B; and an air-conditioning management device 10 that is in wired or wireless connection to the air-conditioning apparatuses 2A and 2B in a manner capable of transmitting information and controls operations of the air-conditioning apparatuses 2A and 2B. The air-conditioning apparatuses 2A and 2B perform air-conditioning by, for example, a heat pump method.

The air-conditioning apparatus 2A includes: an outdoor unit 3A that is a heat source unit; and three indoor units 4A, 5A and 6A connected to the outdoor unit 3A via refrigerant pipes. The air-conditioning apparatus 2B includes: an outdoor unit 3B that is a heat source unit; and two indoor units 4B and 5B connected to the outdoor unit 3B via refrigerant pipes. By circulation of refrigerant through a refrigerant circuit of the outdoor unit 3A and the indoor units 4A to 6A, refrigeration capacity (heat) is supplied to the indoor units 4B and 5B, and the air in a space-to-be-cooled is cooled to perform air-conditioning. Similarly, in the air-conditioning apparatus 2B, by circulation of refrigerant through a refrigerant circuit of the outdoor unit 3B and the indoor units 4B and 5B, refrigeration capacity (heat) is supplied to the indoor units 4B and 5B, and the air in a space-to-be-cooled is cooled to perform air-conditioning.

Note that, in the air-conditioning system 1 in FIG. 1, a case in which the plural air-conditioning apparatuses 2A and 2B are provided is shown as an example; however, there may be one or more devices. Moreover, the number of outdoor units 3A and 3B and indoor units 4A to 6A and 4B to 5B in the air-conditioning apparatuses 2A and 2B is not limited thereto.

In the air-conditioning apparatus 2A, the indoor units 4A and 5A are placed in an air-conditioned area AA1, and the indoor unit 6A is placed in an air-conditioned area AA2. On the other hands, the indoor units 4B and 5B of the air-conditioning apparatus 2B are placed in an air-conditioned area AA3. In this manner, the plural air-conditioning apparatuses 2A and 2B are configured to perform air-conditioning in different air-conditioned areas AA1 to AA3, and the operations of the indoor units 4A and 5A, 6A, and 4B and 5B are controlled in the air-conditioned areas AA1, AA2 and AA3, respectively.

A watt-hour meter 9A is connected to the outdoor units 3A and 3B, and a watt-hour meter 9B is connected to the indoor units 4A to 6A, 4B and 5B. The watt-hour meters 9A and 9B output, for example, pulse signals indicating power consumption amounts to the air-conditioning management device 10 via signal lines. This allows the air-conditioning management device 10 to measure the power consumption amount of the plural air-conditioning apparatuses 2A and 2B in their entirety.

Figure 2:
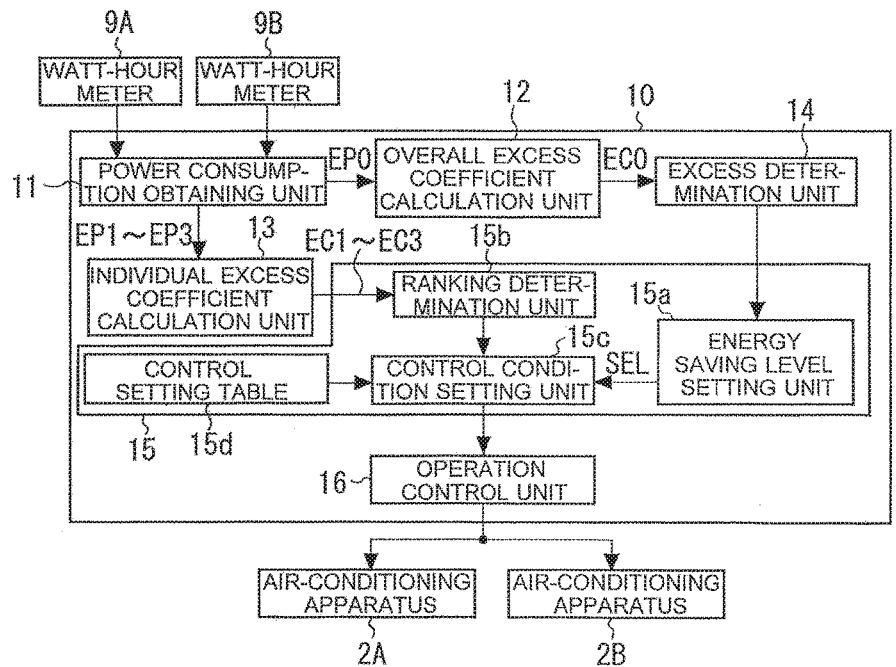
FIG. 2 is a functional block diagram showing the air-conditioning management device in the embodiment according to the present invention.

FIG. 2 is a functional block diagram showing the air-conditioning management device in the embodiment according to the present invention, and the air-conditioning management device 10 will be described with reference to FIG. 1 and FIG. 2. The air-conditioning management device 10 in FIG. 2 controls operations of the plural air-conditioning apparatuses 2A and 2B, and is constituted by, for example, a microcomputer, a DSP or others. The air-conditioning management device 10 has a function of managing power consumption of the air-conditioning apparatuses 2A and 2B, and includes: a power consumption obtaining unit 11; the overall excess coefficient calculation unit 12; the individual excess coefficient calculation unit 13; an excess determination unit 14; and an operation control unit 16.

The power consumption obtaining unit 11 obtains, based on the power consumption amount measured by the watt-hour meters 9A and 9B, an overall power consumption amount EP0 in a day in entirety and individual power consumption amounts EP1 to EP3 in a day in the respective air-conditioned areas AA1 to AA3. At a predetermined time (for example, 23:59), the power consumption obtaining unit 11 adds two power amounts measured by the watt-hour meters 9A and 9B to calculate the overall power consumption amount EP0 in a day.

Moreover, in the power consumption obtaining unit 11, as units for performing energy saving, relations between the plural indoor units 4A to 6A, 4B and 5B and the air-conditioned area AA1 to air-conditioned area AA3 are registered. Then, the power consumption obtaining unit 11 obtains the individual power consumption amounts EP1 to EP3 in a day in the respective air-conditioned areas AA1 to AA3 by prorating the overall power consumption amount to each of the air-conditioned area AA1 to AA3 based on refrigerant circulation amounts, thermostat ON times, operation ON times or the like of the indoor units 4A to 6A, 4B and 5B.

Figure 3:
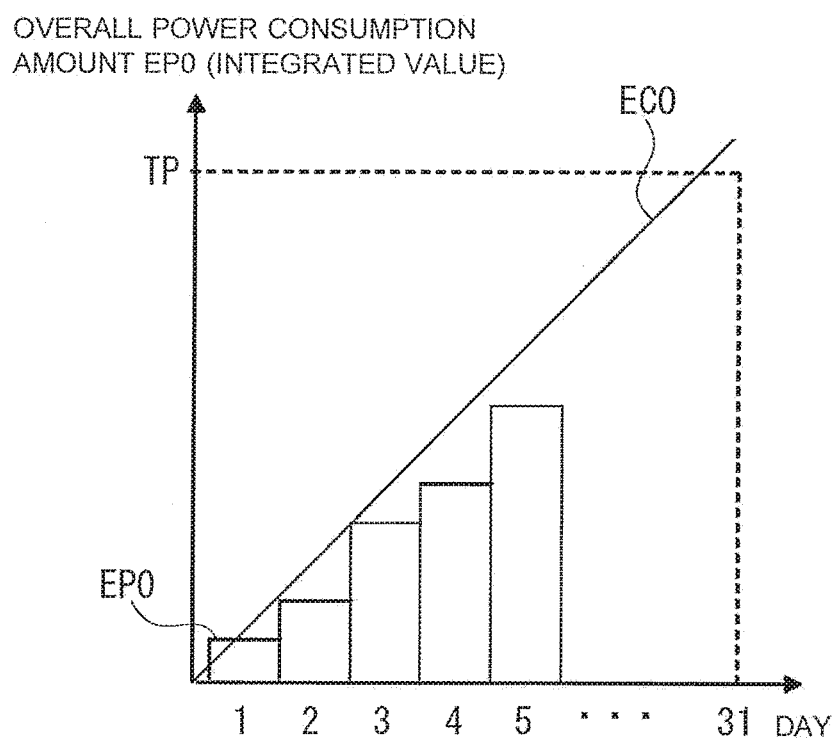
FIG. 3 is a graph showing cumulative addition of overall power consumption amounts on a daily basis.

The overall excess coefficient calculation unit 12 calculates an overall excess coefficient EC0 from the overall power consumption amount EP0 in a day obtained by the power consumption obtaining unit 11 and the overall target value TP0 set on a monthly basis, the overall excess coefficient EC0 indicating a degree of excess from an overall target value TP0 on a monthly basis. FIG. 3 is a graph showing overall power consumption amounts on a daily basis that are cumulatively added. As shown in FIG. 3, the overall target value TP0 on a monthly basis is set in the overall excess coefficient calculation unit 12, and the degree of excess that indicates the excess of cumulative overall power consumption amounts in a month from the overall target value TP0 on a monthly basis is calculated as the overall excess coefficient EC0. The overall target value TP0 on a monthly basis may be calculated based on a yearly target power amount in a year by use of a monthly target power amount ratio, or the overall target value TP0 may be set for each month from January to December.

The overall excess coefficient calculation unit 12 calculates an overall target value TP0$d$ on a daily basis from the overall target value TP0 on a monthly basis, and calculates the overall excess coefficient EC0 (=EP0/TP0$d$) by dividing the overall power consumption amount EP0 in a day by the overall target value TP0$d$ on a daily basis. On this occasion, the overall excess coefficient calculation unit 12 calculates an overall target value on a weekly basis (=TP0/4) from the above-described monthly overall target value TP0. In the overall excess coefficient calculation unit 12, a target power amount ratio on a day of a week (for example, weekday (from Monday to Friday): 18%, Saturday: 8%, Sunday: 2%) is set, and the overall excess coefficient calculation unit 12 calculates the overall target value TP0$d$ on a daily basis to be used on the day from the target power amount ratio on a day of a week and the overall target value on a weekly basis. Note that the overall target value TP0 on a daily basis may be set in the overall excess coefficient calculation unit 12 in advance.

FIG. 4 is a schematic view showing calculation of the overall excess coefficient on a monthly basis in the overall excess coefficient calculation unit in FIG. 2. First, the overall excess coefficient calculation unit 12 calculates the overall excess coefficient EC0 (=EP0/TP0$d$) by dividing the overall power consumption amount in a day by the overall target value TP0$d$ on a daily basis. Next, the overall excess coefficient calculation unit 12 cumulatively adds the overall excess coefficients EC0$d$ from the beginning of the month to the day. Then, the overall excess coefficient calculation unit 12 calculates an average value of the overall excess coefficients EC0$d$ that have been cumulatively added from the beginning of the month to the day as the overall excess coefficient EC0 on a monthly basis.

The individual excess coefficient calculation unit 13 calculates individual excess coefficients EC1 to EC3 from the individual power consumption amounts in a day EP1 to EP3 obtained by the power consumption obtaining unit 11 and the individual target values TP1 to TP3 set on a monthly basis, the individual excess coefficients EC1 to EC3 indicating degrees of excess from the respective individual target values TP1 to TP3 on a monthly basis.

FIG. 5 is a schematic view showing calculation of the individual excess coefficients on a monthly basis in the individual excess coefficient calculation unit in FIG. 2. First, in the individual excess coefficient calculation unit 13, a usage ratio in each of the air-conditioned areas AA1 to AA3 with respect to the overall target value TP0$d$ on a daily basis is set, and the overall excess coefficient calculation unit 12 calculates individual target values TP1$d$ to TP3$d$ of the respective air-conditioned areas AA1 to AA3 based on the overall target value TP0$d$ on a daily basis by use of the usage ratio. Note that the setting of the individual target values TP1$d$ to TP3$d$ is not limited to the above-described calculation method; for example, the setting may be performed for each of the air-conditioned areas AA1 to AA3 in advance.

The individual excess coefficient calculation unit 13 calculates the individual excess coefficients EC1$d$ to EC3$d$ of the respective air-conditioned areas AA1 to AA3 on a daily basis by dividing the individual power consumption amounts EP1 to EP3 of the respective air-conditioned areas AA1 to AA3 obtained by the power consumption obtaining unit 11 by the individual target values TP1$d$ to TP3$d$. Further, the individual excess coefficient calculation unit 13 cumulatively adds the individual excess coefficients EC1$d$ to EC3$d$ from the beginning of the month to the day. Then, the overall excess coefficient calculation unit 12 calculates average values of the individual excess coefficients EC1$d$ to EC3$d$ that have been cumulatively added from the beginning of the month to the day as the individual excess coefficients EC1 to EC3 on a monthly basis.

The excess determination unit 14 in FIG. 2 determines whether or not the overall excess coefficient EC0 calculated in the overall excess coefficient calculation unit 12 is larger than a set threshold value EC0$ref$ (for example, EC0$ref$=1). Note that the set threshold value EC0$ref$ is not limited to the case in which the set threshold value EC0$ref$=1, and may be a value close to 1, such as 0.9. The excess determination by the excess determination unit 14 is performed at a date change time every day, and when the energy saving control is necessary, the energy saving control is performed on the next day. When it is determined that the overall excess coefficient EC0 is larger than the set threshold value EC0$ref$, the energy saving control is performed to limit continuous use until the end of the month while staying in the current status of utilization. On the other hand, when it is determined that the overall excess coefficient EC0 is not more than the set threshold value EC0$ref$, the energy saving control is not performed.

When it is determined in the excess determination unit 14 that the overall excess coefficient EC0 is larger than the set threshold value EC0$ref$, an energy saving control setting unit 15 sets the energy saving control conditions for the respective plural air-conditioned areas AA1 to AA3 to provide high energy saving effects in descending order of the individual excess coefficients EC1 to EC3 calculated in the individual excess coefficient calculation unit 13. Specifically, the energy saving control setting unit 15 includes: an energy saving level setting unit 15$a$; a ranking determination unit 15$b$; a control condition setting unit 15$c$; and a control setting table 15$d$.

The energy saving level setting unit 15$a$ sets an energy saving level SEL in accordance with magnitude of the overall excess coefficient EC0 calculated in the excess determination unit 14, the energy saving level SEL indicating a degree of energy saving effect. For example, the energy saving level setting unit 15$a$ sets the four-stage energy saving levels SEL 1 to 4 in accordance with magnitude of the overall excess coefficient EC0. When the overall excess coefficient EC0 is increased, the energy saving level SEL is increased, and when the overall excess coefficient is decreased, the energy saving level SEL is decreased.

The ranking determination unit 15$b$ determines a priority ranking to perform energy saving control in each of the plural air-conditioned areas AA1 to AA3. The object of the energy saving control is the air-conditioned areas having the large individual excess coefficients EC1 to EC3. Therefore, the ranking determination unit 15$b$ determines the priority ranking of the plural air-conditioned areas AA1 to AA3 according to descending order of the individual excess coefficients EC1 to EC3 calculated for the respective plural air-conditioned areas AA1 to AA3.

The control condition setting unit 15$c$ sets the conditions on the energy saving control for each of the air-conditioned areas AA1 to AA3 from the control setting table 15$d$ based on the energy saving level set in the energy saving level setting unit 15$a$ and the priority ranking of each of the air-conditioned areas AA1 to AA3 determined by the ranking determination unit 15$b$.

FIG. 6 and FIG. 7 are schematic views each showing an example of the control setting table in FIG. 4. Note that FIG. 6 exemplifies a case in which the energy saving level SEL=1 in the control setting table 15$d$, and FIG. 7 exemplifies a case in which the energy saving level SEL=4 in the control setting table 15$d$. Moreover, in FIG. 6 and FIG. 7, it is assumed that the individual excess coefficients EC1 to EC3 result in the priority ranking of the air-conditioned areas AA3, AA1, and AA2.

As shown in FIG. 6 and FIG. 7, in the control setting table 15$d$, the priority ranking and the contents of the energy saving control are associated in each of the energy saving levels SEL to be stored. For example, when the energy saving level=1 in FIG. 6, the energy saving control condition such that the degree of power reduction amount for the air-conditioned areas that are ranked first and second in the priority ranking becomes medium is set, and the energy saving control condition such that the degree of power reduction amount for the air-conditioned areas that are ranked third and fourth in the priority ranking becomes medium is set. Moreover, the energy saving control is not performed for the air-conditioned areas ranked fourth or lower in the priority ranking. In this way, setting is made so that the degree of the power reduction amount becomes higher with the higher priority ranking, and setting is made the energy saving effect becomes higher.

On other hand, when the energy saving level=4 in FIG. 7, the energy saving control condition such that the degree of power reduction amount for the air-conditioned areas that are ranked first to fourth in the priority ranking is increased is set, and the energy saving control condition such that the degree of power reduction amount for the air-conditioned areas that are ranked fifth and sixth in the priority ranking becomes medium and the energy saving effect is lower than that for the first to fourth in the priority ranking is set. Further, the energy saving control is not performed for the air-conditioned areas ranked seventh or lower in the priority ranking, and thereby the energy saving effect is set lower than that for the first to sixth in the priority ranking. Note that, as the specific examples of the energy saving control conditions in FIG. 6 and FIG. 7, publicly known control methods for reducing power, such as, for example, changes in setting temperature, ON/OFF of thermostat, changes in capacity of the compressor or others can be applied.

Then, based on the control setting table $15d$, the control condition setting unit $15c$ sets the conditions on the energy saving control for each of the air-conditioned areas AA1 to AA3 based on the energy saving level SEL set in the energy saving level setting unit $15a$ and the priority ranking of each of the air-conditioned areas AA1 to AA3 determined in the ranking determination unit $15b$. Then, the operation control unit 16 changes control contents for the next day by use of the energy saving control set in the control condition setting unit $15c$, and performs energy saving control of each of the plural air-conditioned areas AA1 to AA3 by the air-conditioning apparatuses 2A and 2B.

Figure 8:
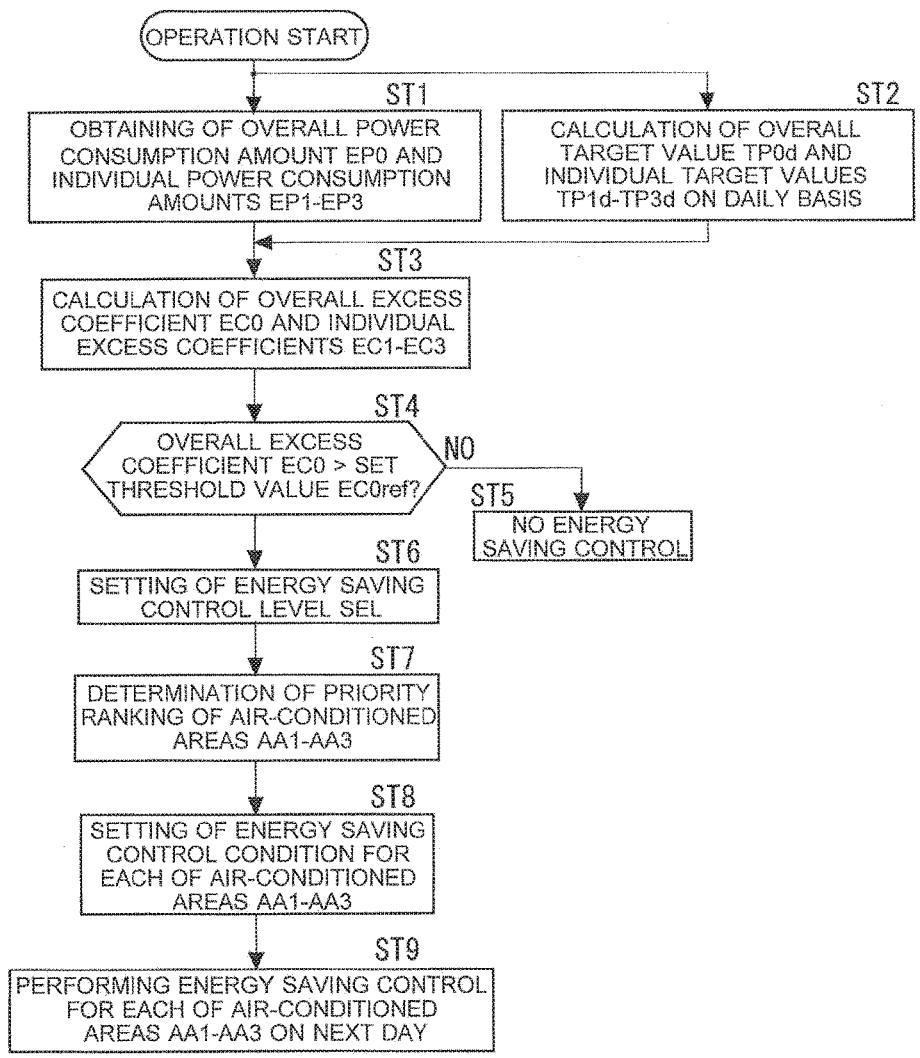
FIG. 8 is a flowchart showing an operation example of the air-conditioning management device in FIG. 2.

FIG. 8 is a flowchart showing an operation example of the air-conditioning management device in FIG. 2, and the operation example of the air-conditioning management device will be described with reference to FIG. 1 to FIG. 7. First, when the predetermined time (for example, 23:59) comes, in the power consumption obtaining unit 11, the overall power consumption amount EP0 from the watt-hour meters 9A and 9B and the individual power consumption amounts EP1 to EP3 in the respective plural air-conditioned areas AA1 to AA3 are obtained (step ST1). At the same time, in the overall excess coefficient calculation unit 12 and the individual excess coefficient calculation unit 13, the overall target value $TP0d$ on a daily basis and the individual target values $TP1d$ to $TP3d$ are calculated (step ST2).

Then, in the overall excess coefficient calculation unit 12 and the individual excess coefficient calculation unit 13, the overall excess coefficient EC0 and the individual excess coefficients EC1 to EC3 are calculated (step ST3, refer to FIG. 4 and FIG. 5). Thereafter, in the excess determination unit 14, it is determined whether or not the overall excess coefficient EC0 is larger than the set threshold value $EC0ref$ (step ST4). When the overall excess coefficient EC0 is not larger than the set threshold value $EC0ref$ (NO in step ST4), it is determined that the energy saving control is unnecessary (step ST5).

On the other hand, when it is determined that the overall excess coefficient EC0 is larger than the set threshold value $EC0ref$ (YES in step ST3), the energy saving level SEL is set in accordance with magnitude of the overall excess coefficient EC0 by the energy saving level setting unit $15a$ (step ST6). Moreover, in the ranking determination unit $15b$, based on the individual excess coefficients EC1 to EC3, the priority ranking is determined for each of the plural air-conditioned areas AA1 to AA3 (step ST7).

Thereafter, in the control condition setting unit $15c$, the energy saving control is set for each of the air-conditioned areas AA1 to AA3 with reference to the control setting table $15d$ so that the saving amount of power is increased in descending order of the priority ranking (step ST8, refer to FIG. 6 and FIG. 7). Then, in the operation control unit 16, operations of the air-conditioning apparatuses 2A and 2B are controlled from the next day by use of the changed control contents (step ST9).

According to the above-described embodiment, by determining whether or not the energy saving control is to be performed based on the status of the overall power consumption amount EP0 on a monthly basis, it is possible to lower the electric bills on a monthly basis to a target value or less. In other words, by determining necessity of the energy saving control based on the overall excess coefficient EC0 on a monthly basis, it is possible to lower, not only the basic rates, but also the usage-based rates of the electric bills on a monthly basis.

On this occasion, by setting the priority ranking of the energy saving control as the individual excess coefficients EC1 to EC3 of the plural air-conditioned areas AA1 to AA3 are increased, fairness can be ensured. In other words, conventionally, an object of the energy saving operation is determined based on the energy saving priority set by a user. Therefore, an indoor unit provided with low energy saving priority is brought into a state in which the energy saving control is less likely to be operated, and consciousness about energy saving is decreased in some cases in the air-conditioned space where the indoor unit is placed. As a result, in the air-conditioned space of low energy saving priority, fairness cannot be ensured in some cases.

On the other hand, in the air-conditioning management device 10 in FIG. 2, for example, the energy saving control for large saving amount of power and high energy saving effect is performed in the air-conditioned area (department) having the high individual excess coefficient EC3, and the energy saving control is not performed or the energy saving control for small saving amount of power and low energy saving effect is performed in the air-conditioned area (department) having the low individual excess coefficient EC2. Then, the energy saving control is not performed in the air-conditioned area (department) of high degree of contribution to energy saving and the energy saving control is imposed in the air-conditioned area (department) of low degree of contribution to energy saving, and therefore, fairness can be ensured. With this, the consciousness about energy saving on a department basis or an individual basis is improved, changes in consciousness about a tendency to forget to turn off the lights or an operating system when a small staff is working overtime, and the like can be expected.

Further, when the overall excess coefficient calculation unit 12 converts the overall target value TP0 set on a monthly basis into the overall target value $TP0d$ on a daily basis, calculates the overall excess coefficient $EC0d$ by dividing the overall power consumption amount EP0 in a day by the overall target value TP0 on a daily basis, and calculates an average value on a monthly basis of the calculated overall excess coefficient EC0d as the overall excess coefficient EC0, an excess power amount of the power consumption on a monthly basis can be predicted with high accuracy.

Similarly, when the individual excess coefficient calculation unit 13 stores power usage ratio of each of the plural air-conditioned areas AA1 to AA3, calculates the individual target values TP1d to TP3d of the respective plural air-conditioned areas AA1 to AA3 from the overall target value TP0d by use of the power usage ratio, calculates the individual excess coefficients EC1d to EC3d by dividing the individual power consumption amounts EP1 to EP3 in a day by the individual target values TP1d to TP3d on a daily basis, and calculates average values of the calculated individual excess coefficients EC1d to EC3d on a monthly basis as the individual excess coefficients EC1 to EC3, an excess power amount of power consumption in each of the plural air-conditioned areas AA1 to AA3 on a monthly basis can be predicted with high accuracy.

Further, the energy saving control setting unit 15 sets the priority ranking of the energy saving control for the air-conditioned areas AA1 to AA3 in accordance with the individual excess coefficients EC1 to EC3, respectively, based on the control setting table 15d, to perform energy saving control of the air-conditioning apparatuses 2A and 2B based on the priority ranking. Consequently, it is possible not to perform the energy saving control in the air-conditioned area that uses power of not larger than the target power amount and to securely perform the energy saving control preferentially in the air-conditioned area that uses power larger than the target power amount. Therefore, fairness among the air-conditioned areas can be securely kept and the consciousness about energy saving can be increased.

The embodiment of the present invention is not limited to the above-described embodiment. For example, in the air-conditioning system 1 in FIG. 1, the case in which the air-conditioning apparatus 2A performs air-conditioning in the two air-conditioned areas AA1 and AA2 and the air-conditioning apparatus 2B performs air-conditioning in the single air-conditioned area AA3 is shown; however, the air-conditioning apparatus 2A may perform air-conditioning in three or more air-conditioned areas, or the air-conditioning apparatus may be provided in each of the air-conditioned areas AA1 to AA3.

REFERENCE SIGNS LIST 1 air-conditioning system 2A, 2B air-conditioning apparatus 3A, 3B outdoor unit 4A to 6A, 4B, 5B indoor unit 9A, 9B watt-hour meter 10 air-conditioning management device 11 power consumption obtaining unit 12 overall excess coefficient calculation unit 13 individual excess coefficient calculation unit 14 excess determination unit 15 energy saving control setting unit 15a energy saving level setting unit 15b ranking determination unit 15c control condition setting unit 15d control setting table 16 operation control unit AA1 to AA3 air-conditioned area EC0, EC0d overall excess coefficient EC0ref set threshold value EC1d to EC3d, EC1 to EC3 individual excess coefficient EP0 overall power consumption amount EP1 to EP3 individual power consumption amount SEL energy saving level TP0, TP0d overall target value TP1d to TP3d, TP1 to TP3 individual target value

The invention claimed is:

1. An air-conditioning management device configured to manage power consumption amounts of one or a plurality of air-conditioning apparatuses performing air-conditioning in a plurality of air-conditioned areas, the air-conditioning management device comprising:
a power consumption obtaining unit configured to obtain an overall power consumption amount of the one or plurality of air-conditioning apparatuses in their entirety in one day and individual power consumption amounts of the respective plurality of air-conditioned areas;
an overall excess coefficient calculation unit configured to calculate an overall excess coefficient from the overall power consumption amount in one day obtained by the power consumption obtaining unit and an overall target value set on a monthly basis, the overall excess coefficient indicating a degree of excess from the overall target value on the monthly basis;
an individual excess coefficient calculation unit configured to calculate individual excess coefficients from the individual power consumption amounts in one day obtained by the power consumption obtaining unit and individual target values set on a monthly basis, the individual excess coefficients each indicating a degree of excess from the individual target value on the monthly basis;
an excess determination unit configured to determine whether or not the overall excess coefficient calculated in the overall excess coefficient calculation unit is larger than a set threshold value;
an energy saving control setting unit configured to set energy saving control conditions for the respective plurality of air-conditioned areas to provide increased energy saving effects in descending order of the individual excess coefficients calculated in the individual excess coefficient calculation unit when the overall excess coefficient is determined, in the excess determination unit, to be larger than the set threshold value; and
an operation control unit configured to perform energy saving operation of the air-conditioning apparatuses based on the energy saving control conditions set in the energy saving control setting unit.

2. The air-conditioning management device of claim 1, wherein the overall excess coefficient calculation unit is configured to convert the overall target value set on the monthly basis into the overall target value on a daily basis, calculate the overall excess coefficient on a daily basis by dividing the overall power consumption amount in one day by the converted overall target value on the daily basis, cumulatively add the overall excess coefficient on the daily basis from beginning of a month to a current day, and calculate an average value of the cumulatively added overall excess coefficient as the overall excess coefficient on a monthly basis.

3. The air-conditioning management device of claim 2, wherein the individual excess coefficient calculation unit is configured to store a power usage ratio of each of the plurality of air-conditioned areas, calculate the individual target value on a daily basis in each of the plurality of air-conditioned areas from the overall target value on the daily basis by use of the power usage ratio, calculate the individual excess coefficient on a daily basis by dividing the individual power consumption amount in one day by the individual target value on the daily basis, cumulatively add the individual excess coefficients on the daily basis from beginning of a month to a current day, and calculate an average value of the cumulatively added individual excess coefficients as the individual excess coefficient on a monthly basis.

4. The air-conditioning management device of claim 1, wherein the energy saving control setting unit comprises:
- an energy saving level setting unit configured to set energy saving levels each indicating a degree of energy saving control in accordance with magnitude of the overall excess coefficient;
- a control setting table configured to store a content of the energy saving control and a priority ranking of the energy saving control associated with each other for each of the energy saving levels;
- a ranking determination unit configured to determine a priority ranking to perform the energy saving control in descending order of values of the individual excess coefficients; and
- a control condition setting unit configured to set conditions on the energy saving control for each of the air-conditioned areas from the control setting table based on the energy saving level set in the energy saving level setting unit and the priority ranking of each of the air-conditioned areas determined in the ranking determination unit.

5. An air-conditioning system comprising:
- one or a plurality of air-conditioning apparatuses performing air-conditioning in a plurality of air-conditioned areas; and
- the air-conditioning management device of claim 1 configured to manage power consumption amounts of the one or plurality of air-conditioning apparatuses.

* * * * *